United States Patent
Ohishi et al.

(10) Patent No.: US 7,551,352 B2
(45) Date of Patent: Jun. 23, 2009

(54) IMAGE DISPLAY APPARATUS, AS WELL AS, FRESNEL LENS SHEET AND SCREEN TO BE USED THEREIN

(75) Inventors: Tetsu Ohishi, Hiratsuka (JP); Hiroki Yoshikawa, Hiratsuka (JP); Takanori Hisada, Yokohama (JP); Koji Hirata, Yokohama (JP); Masahiko Yatsu, Fujisawa (JP); Daisuke Imafuku, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 177 days.

(21) Appl. No.: 11/200,354

(22) Filed: Aug. 8, 2005

(65) Prior Publication Data

US 2006/0092511 A1 May 4, 2006

(30) Foreign Application Priority Data

Nov. 1, 2004 (JP) ............................. 2004-317711
Apr. 21, 2005 (JP) ............................. 2005-123079

(51) Int. Cl.
*G03B 21/56* (2006.01)
*G03B 21/60* (2006.01)

(52) U.S. Cl. ...................... 359/460; 359/457
(58) Field of Classification Search ................ 359/460, 359/443, 454–457, 452
See application file for complete search history.

(56) References Cited

U.S. PATENT DOCUMENTS

| 4,439,027 A | * | 3/1984 | Shioda et al. .................. 353/77 |
| 5,513,036 A | * | 4/1996 | Watanabe et al. ............ 359/457 |
| 6,573,950 B1 | * | 6/2003 | Hirata et al. ................. 348/744 |
| 2002/0044263 A1 | * | 4/2002 | Takeuchi ...................... 353/69 |

FOREIGN PATENT DOCUMENTS

| JP | 5-333437 | 12/1993 |
| JP | 2002-341452 | 11/2002 |

* cited by examiner

*Primary Examiner*—Diane I Lee
*Assistant Examiner*—Magda Cruz
(74) *Attorney, Agent, or Firm*—Townsend and Townsend and Crew LLP

(57) ABSTRACT

To eliminate or otherwise reduce non-uniform brightness of an image of a display apparatus, an image is projected through a projection optical system having a projection lens (2), curved surface reflection mirrors (4 and 5), and a reflection mirror (6) onto a rear surface of the rear-surface projection type screen (3). The rear-surface projection type screen includes a Fresnel lens sheet (8), wherein the prism surfaces of the Fresnel lens are formed in an aspheric configuration, thereby letting the light beams from the screen to exit at an exit angle of about zero (0) degree relative to a line perpendicular to the screen surface, over most of the entire surface thereof. It is possible to obtain a projection image that having uniform brightness in an image display apparatus while maintaining a thin cabinet (7) profile.

12 Claims, 6 Drawing Sheets

IMAGE DISPLAY APPARATUS, AS WELL AS, FRESNEL LENS SHEET AND SCREEN TO BE USED THEREIN

BACKGROUND OF THE INVENTION

1. Field of the Invention

The present invention relates to an image display apparatus of a projection type, applying an oblique projection optical system therein, for projecting a picture of an image generation source onto a screen of rear-projection type, from a direction inclined thereto, and also a Fresnel lens sheet and a screen of rear-projection type, to be used in such the image display apparatus.

2. Description of the Related Art

For coping with thinning of the image display apparatus, in particular, of the projection type, there is already known the structure of applying the inclined or oblique structure, for projecting an enlarged picture onto a screen from a direction inclined or oblique thereto, by using a reflection mirror, i.e., so-called an oblique projection optical system. In this instance, since the enlarged picture is projected onto the screen, obliquely (i.e., in a manner of defining a predetermined angle between a perpendicular line drawn from the principle plane on the screen and an incident direction of a light at a center of the enlarged picture), the image projected on the screen is distorted. Then, for correcting such the distortion, there is also already known the structure of an image display apparatus, adopting within a portion of the reflection mirror a curved surface reflection mirror, which is formed with a curved surface, for example, in Japanese Patent Laying-Open No. 2002-341452 (2002).

SUMMARY OF THE INVENTION

In general, with such the image display apparatus as was mentioned above, if the screen sizes are same to each other, then the thinner in the depth thereof, the more advantageous in an aspect of the weight, the costs, or the space for instillation, etc. Namely, with the conventional technology mentioned above, for the purpose of reducing the depth of the image display apparatus, the enlarged picture is projected onto the screen from the direction oblique thereto. As a result of this, for correcting a trapezoidal image distortion caused due to the image projection from the said oblique direction, there is adopted that structure of applying the projection optical system, which is provided with the curved surface reflection mirror within an optical path, as was mentioned above.

By the way, on the screen, it is preferable to obtain an image having a uniform brightness all over the surface thereof, irrespective of the position at which a viewer takes a look thereon. For that purpose, when exitting lights of the enlarged picture from a projection lens upon the said screen, it is necessary to bring them to be nearly parallel with, with respect to the viewer side. For achieving this, in general, there is applied a Fresnel lens sheet comprising concentric Fresnel lenses, each having a prism surface, an original surface of which is in the shape of a spherical surface, as an constituent element of the screen. Herein, an original surface means a curve connecting each of the prism surfaces upon an entire of the Fresnel lens sheet, i.e., a hypothetical surface, which can be formed from envelope curves of a gathering of all prism surfaces upon an entire of the Fresnel lens sheet. Brining this original surface into a spherical one enables to make the exit lights in parallel with (i.e., in a direction in parallel with the perpendicular line drawn on the screen), over the entire surface of the screen, by reflecting the image light, being projected from an exit pupil of the projection lens at each point on the screen, radially, into the direction in parallel with the perpendicular line to the screen, upon the each prism surface.

However, with the conventional technology mentioned above, there is caused the following problem. Namely, when the image light directing from the exit pupil of the projection lens onto the screen is reflected upon the curved surface mirror included within the oblique projection optical system, an angle of the incident light upon the screen is changed depending on the reelecting position on that curved reflection mirror. Thus, when applying the oblique projection optical system mentioned above, the image light directing from the exit pupil of the projection lens towards the screen does not comes to be uniform in the radiation. For this reason, with such the Fresnel lens sheet as was mentioned above, i.e., the original surface thereof is made into such spherical surface, it is impossible to exit the enlarged image light from the projection lens nearly in parallel with, upon the entire surface of the screen. Accordingly, the exit angle from the Fresnel lens sheet lacks uniformity, and therefore, there is still a drawback that uniformity is caused in the brightness of an image projected on the screen, in particular, when this is observed from the viewer side.

An object is, according to the present invention, is to provide a technology, being suitable for obtaining uniformity in the brightness of the image projected on the screen, while reducing the depth of the apparatus.

According to the present invention, the original surface of the Fresnel lenses, which are formed on the Fresnel lens sheet, is in the shape of an aspheric surface, depending on an incident angle of the light beam upon the screen. In this instance, the Fresnel angle on each the prism surface is made larger in an upper portion of the Fresnel lens sheet than that in a lower portion thereof. With this, the projection image, being incident upon the incident surface of the said Fresnel lens sheet, can exit at an exit angle of 0 degree, approximately, from the exit surface of the said Fresnel lens sheet, over the entire surface of said screen.

The Fresnel lenses mentioned above are formed concentrically around the same point, and it is preferable that this central point locates on an outside (of an image display region or area) on the said screen. And, it is also preferable that the projection optical portion for projecting the enlarged image obliquely onto the screen includes a curved surface for correcting or compensating the distortion and the aberration due to the oblique projection upon the screen, i.e., at least one refraction-type free curved surface and/or a reflection-type free curved surface.

With such the structure as was mentioned above, even in the case of applying therein a projection optical system, having a curved surface for compensating the trapezoidal image distortion caused due to the oblique projection, it is possible to deal with the changes in the incident angel of the light beam incident onto the screen, which is caused by the reflection from that curved surface. Thus, even when such the change is generated in the incident angle, with an aid of the Fresnel lens having the Fresnel angle corresponding to that, it is possible to refract the incident light into the direction, nearly in parallel with the perpendicular line to the screen (i.e., in the direction perpendicular to the principle plane drawn on the screen), to exit therefrom. Accordingly, with such the structure according to the present invention, it is possible to align the direction of the exit lights in parallel with the perpendicular line to the screen, approximately, over the screen as a whole; thereby, enabling to achieve reduction of the size, in particular, the depth of the image display apparatus, and to obtain the projection screen having uniform brightness, as well.

Thus, according to the present invention, it is possible to display an image of high quality, with much uniformity in the brightness of the image, which is projected on the screen, while reducing the depth of the apparatus.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 1:
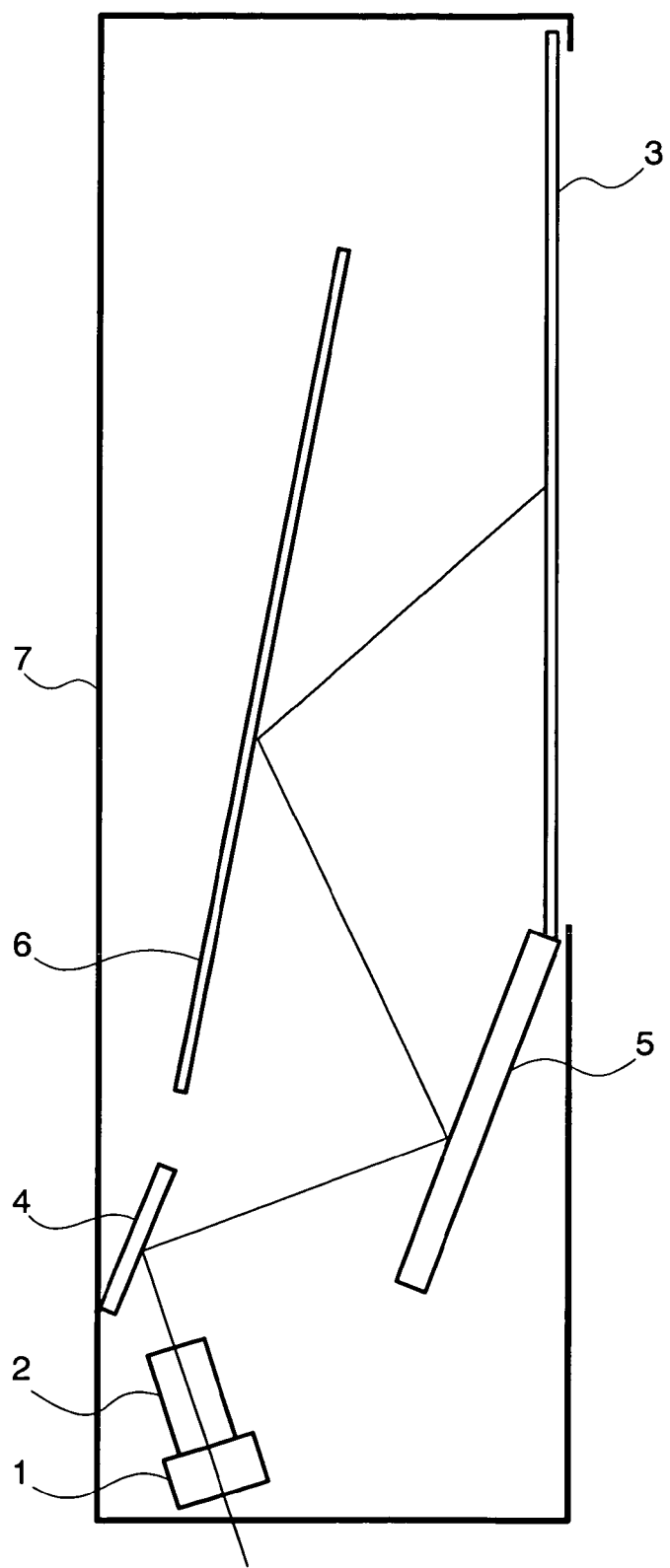
FIG. 1 is a cross-section view for showing an example of the structure of an image display apparatus, according to an embodiment of the present invention.

First of all, FIG. 1 attached herewith is the cress-sectional view of the image display according to the present invention. In the figure, an image-generating source 1, it may include a projection-type cathode-ray tube, for example. Also, it may include a liquid crystal panel of reflection-type/transmission-type, or an image modulator element, such as, a display element, etc., having a minute mirrors in plural numbers thereof, for example. In case when using such the image modulator element, the image generating source includes a light source for irradiating a light upon that image modulator element, such as, a mercury lamp, etc., and then the image modulator element makes up an image by conducting image modulation upon the light from the said light source, for each of pixels, depending upon an input image signal; thereby forming the image. With this, a small-size image is displayed on the display screen of the image-generating source 1. A projection optical system for projecting this small-size image, enlargedly, on a screen 3 of rear-surface projection type includes, as is apparent from the figure, a projection lens 2, building up an image enlarging portion for enlarging/projecting the image mentioned above onto the rear-surface projection type screen 3, a first curved-surface reflection mirror 4 for reflecting the image light exiting from that projection lens thereupon, a second curved-surface reflection mirror 5 for reflecting the image light reflected upon that first curved-surface reflection mirror 4, and a reflection mirror 6, being plane-like, for example, for reflecting the image light thereupon, which is reflected upon the second curved-surface reflection mirror 5 mentioned above, for reducing the depth of the image display apparatus. Those of the projection lens 2, the first curved-surface reflection mirror 4, the second curved-surface reflection mirror 5, and the plane-like reflection mirror 6 are disposed on the way of an optical path, which starts from the image generating source 1 and reaches to the rear-surface projection type screen 3. Further, those elements are received within an inside of a housing 7 of the image display apparatus, each being fixed at a predetermined position thereof.

Thus, according to the image display apparatus, the structures of which is explained in the above, the image light exiting from the projection lens 2 is projected, obliquely onto the rear-surface projection type screen 3. Namely, the light beam at the image center (i.e., a light beam exiting from a central position of the image modulator element) is projected from below, by a predetermined angle to the perpendicular line to the principle plane of the rear-surface projection type screen 3. This image light projected obliquely produces on the rear-surface projection type screen 3, not only the trapezoidal distortion mentioned above, but also the aberration thereon. For this reason, those will be corrected or compensated by means of the first curved-surface reflection mirror 4 and the second curved-surface reflection mirror 5.

Figure 2:
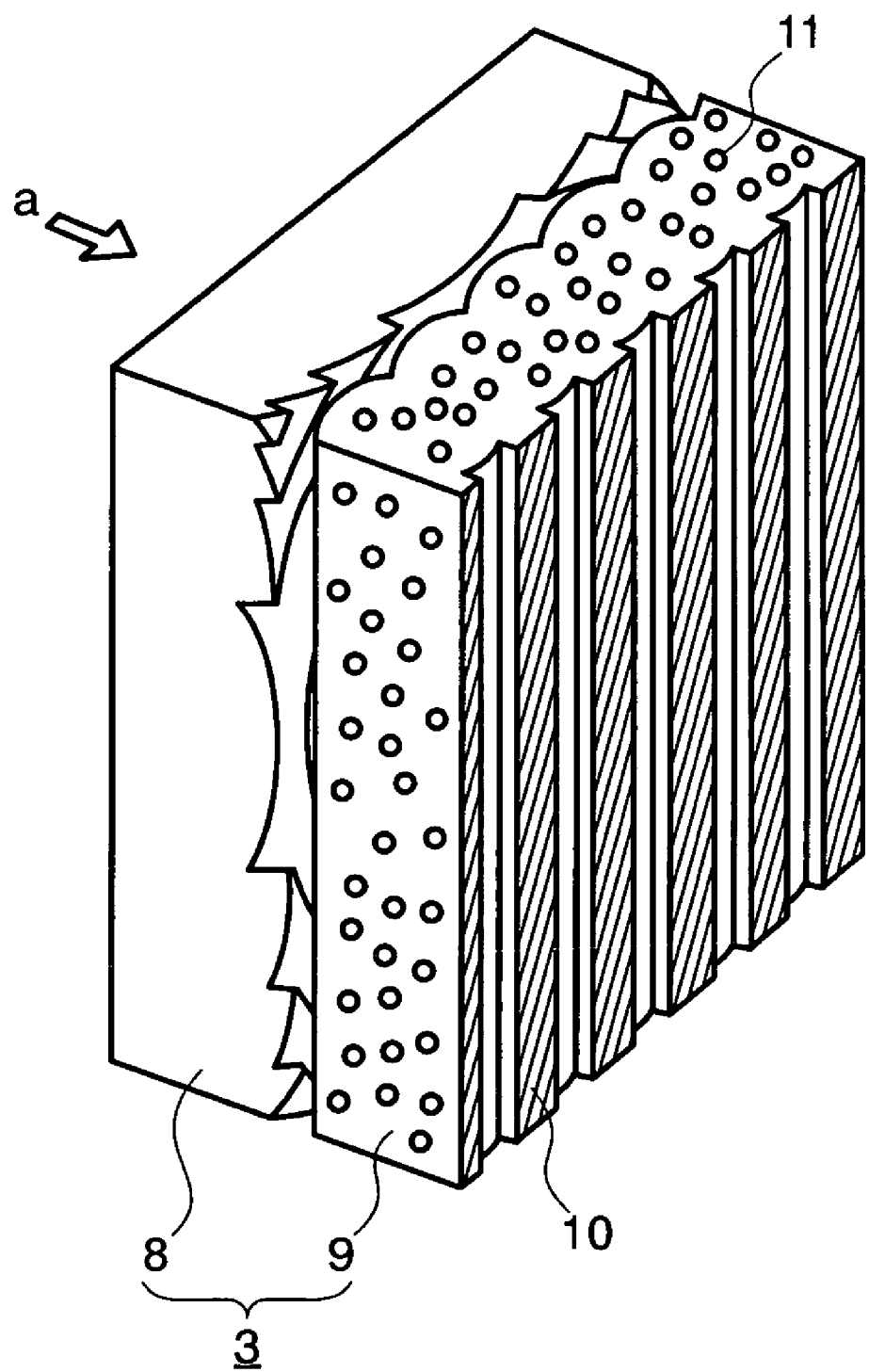
FIG. 2 is a perspective view of a rear-projection type screen, according to the present embodiment.

FIG. 2 attached herewith shows the detailed structure of the rear-surface projection type screen 3, within the image display apparatus according to the present invention. Thus, FIG. 2 shows a perspective view of a portion, which is cut out from the rear-surface projection type screen 3. This rear-surface projection type screen 3 has, as is apparent from the figure, a Fresnel lens of refraction-type, the original surface of which is formed to be aspheric one, for determining the Fresnel angle of the prism surface thereof, i.e., so-called an aspheric surface Fresnel lens sheet 8 (hereinafter, being called by only "Fresnel lens sheeet"), and a lenticular lens sheet 9. Herein, the Fresnel lenses are assumed to be formed in plural numbers thereof, as is shown in the figure, concentrically, around a certain point to be a central point, on the light exit surface of the Fresnel lens sheet 8. Also, the Fresnel angle indicates an angle, which is defined between the prism surface and the principle plane of the Fresnel lens sheet. With the rear-surface projection type screen 3 of such structure, the light of the enlarged projection image (not shown in the figure) to be projected into a direction of an arrow "a" in the figure, is converted into a light being nearly in parallel with the perpendicular line to the principle plane of the rear-surface projection type screen 3, due to the function of the Fresnel sheet, i.e., the aspheric surface prisms building up that sheet. Or, alternately, the light of the enlarged projection image mentioned above is converted into a light directing into an inside a little bit, i.e., directing to the center of the rear-surface projection type screen 3. In other words, an exit angle of the lights exiting from the Fresnel lens sheet 8, i.e., an angle with respect to the perpendicular line to the rear-surface projection type screen 3 is 0 degree, approximately. Thereafter, the light exiting from the Fresnel lens sheet 8 in incident upon the lenticular lens sheet 9. However, the lenticular lens sheet 9 has such configuration that, as is shown in the figure, the lenticular lenses, each directing the longitudinal direction thereof into the vertical direction, are aligned in plural numbers thereof into the horizontal direction of the screen surface. For this reason, it has a function of diffusing the light exiting from the Fresnel lens sheet 8 in the vertical direction of the screen surface. Also, at a position opposing to a boundary between the lenticular lenses, there is formed a black stripe extending into the direction perpendicular to the screen surface. With this, an external light is absorbed, which incident upon it from an exit side of the screen. Further, on this lenticular lens sheet 9 is formed a diffusion member 11, in which a diffusion material is mixed. For this reason, the diffusion member 11 has a function of diffusing the image light into the horizontal and the vertical directions of the screen surface.

However, not shown in the figure, a plane-like front-face sheet may be disposed on the light exit side of the lenticular lens sheet 9. Also, this front-face sheet may be combined or bonded on the lenticular lens sheet 9, with using a adhesive, in one body. Further, the a diffusion material 11 may not mixed into the lenticular lens sheet 9, but into the front-face sheet. Further, also an antireflection film or a hard coat may be formed on the light exit side surface of the front-face sheet. Also, in FIG. 2, although the second lenticular lens is formed at the position opposing to the exit surface of the lenticular sheet 9, i.e., at the focus position of the lenticular lens, however, that focus portion may be made plane-like when using the image modulator element mentioned above to be the image generating source 1. In case when combining the front-face sheet and the lenticular lens sheet 9, it is preferable that no air is contained within, upon the surface combining the both.

Figure 3:
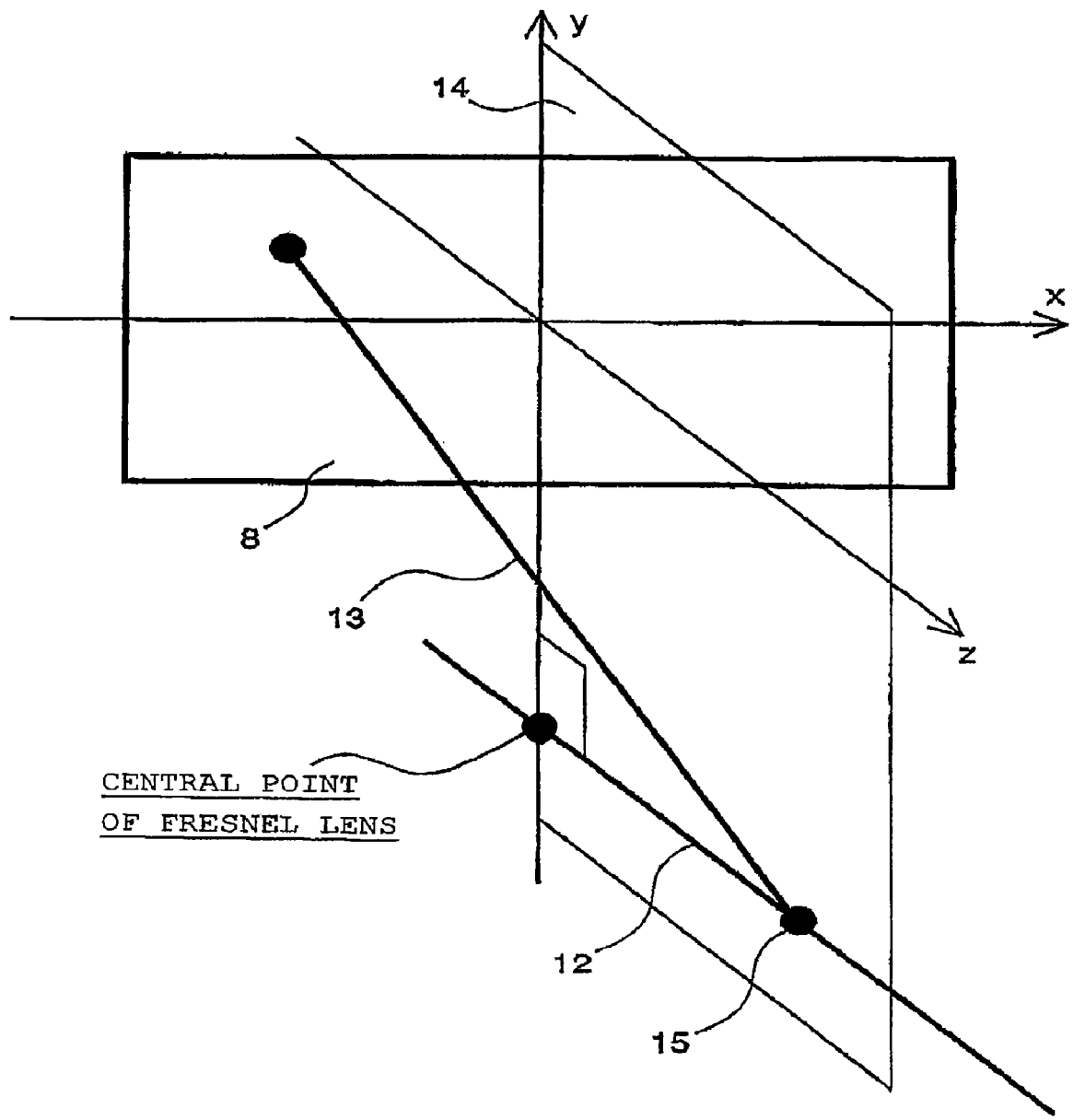
FIG. 3 is a view for explaining about a method for determining the configuration of a prism portion building up a Fresnel lens, within a Fresnel lens sheet according to the present embodiment.

Next, detailed description will be made about a method for determining a surface configuration (i.e., the original surface of the Fresnel lens) of the plural numbers of prism surfaces, which are formed in a concentric manner, in relation to the Fresnel lens formed on the Fresnel lens sheet mentioned above, by referring to FIG. 3 attached herewith. However, as was mentioned above, the prism surfaces of the prism lenses building up that Fresnel lens sheet are formed in the concentric manner, around a certain point (i.e., a rotation axis). And, an original surface is in the shape of an aspheical surface, for determining the Fresnel angle of the prism surface in each of the Fresnel lenses, i.e., an angle defined between the said prism surface and the principle plane of the Fresnel lens sheet 8. Herein, the original is, as was mentioned above, for determining the Fresnel angle of the each prism surface, and it indicates that lens surface when unifying the entire of the Fresnel lens sheet 8 in one body. Namely, when determining the Fresnel angle for the prism surface of the Fresnel lenses, assuming that the entire Fresnel lenses 8 has a certain lens characteristic, first, the surface configuration of that lens is determined to be the original surface. Then, the configurations corresponding to the respective points on the Fresnel lens sheet of that original surface (i.e., tangential lines on the original surface at the said respective points, for example) are extended on the surface of the Fresnel lens sheet 8. With this, the Fresnel angles are determined at the respective points on the Fresnel lens sheet 8. Accordingly, the original surface mentioned above is presented by a curve connecting the respective prism surfaces over the whole of the Fresnel lens sheet, depending on the Fresnel angles thereof, indicates, i.e., an envelope covering the aggregation of all the prism surfaces on the Fresnel lens sheet as a whole. Therefore, the direction of refracting a light on the prism surface at each point on each of the Fresnel lens sheet is determined on the configuration of the original surface mentioned above, corresponding to the each prism. However, it is assumed that the rotation axis mentioned above comes across the principle plane of the Fresnel lens sheet 8 (i.e., the xy plane in the figure). Also, this rotation axis includes a point 15, at which the light beam 13 incident upon the Fresnel lens sheet 8 comes across a surface 14 (i.e., a surface in parallel with a yz plane), which divides vertically the Fresnel lens sheet 8 into both sides, equally. Thus, the rotation axis comes to be an axis perpendicular to the principle plane of the Fresnel lens sheet 8, i.e., an axis 13 shown in FIG. 3.

However, in the above, since the incident light beam 13 changes the incident angle (i.e., an angle to the perpendicular line to the incident surface), depending upon the position on the screen, therefore the axes 12, which can be obtained in the above, are also plural in the number of pieces thereof, herein. Further, among those plural numbers of axes, an axis locating at around the center thereof is determined to be the rotation axis of the Fresnel lenses (thus, the center position of the concentric prisms building up the Fresnel lens sheet).

Following to the above, the configuration (i.e., an angle) about the Fresnel angle of the each prism surface is obtained, as follows. First, while refracting the incident light beam on the screen upon the prism surface of the Fresnel lens sheet 8, an angle of the prism is obtained for exiting the light into the direction of the perpendicular line (i.e., the exit angle is zero (0)), for each of the points on the Fresnel lens sheet 8, respectively, in accordance with the law of Snell. Next, by bringing the said prism surfaces obtained to be continuous with, the original surface (i.e., the aspheric surface) is formed for the Fresnel lenses. However, the original surface obtained can be approximated, by an aspheric equation. In this instance, further comparison is made between the aspheric coefficient approximated and the exit angle of the actual light beam, so as to add necessary corrections and/or changes onto the position of the rotation axis and the aspheric coefficients, appropriately, so that the exit angle comes to about zero (0) degree.

In this manner, the Fresnel lens sheet 8 is built up with the above elements, which can be obtained in the above, i.e., the position of the rotation axis, being the rotation center of the concentric prism portions building up the Fresnel lenses, and the aspheric coefficients of the original surface. And, with such building up of the Fresnel lens sheet 8, in this manner, it is possible to let the image lights incident upon the screen to exit from the screen, while keeping the exit angle to the screen to be around zero (0) degree, through the curved surface mirrors (i.e., the first curved surface mirror 4 and the second curved surface mirror 5), which are provided on the way of the light path, within the projection optical system of the image display apparatus. Accordingly, with the Fresnel lens sheet according to the present invention, it is possible to maintain the brightness of the image to be nearly uniform, all over the surface of the screen.

Next, an example of numerical values of the respective optical parts will be shown, in case when applying the Fresnel lens sheet 8 into the image display apparatus having a screen diagonal of 50 inches (a ratio between vertical and horizontal=9:16, for example). However, the following Table 1 shows the positions of the optical parts on and after the projection lens 2 by (x, y, z, angle, distance). Herein, an angle of the projection lens indicates the exit angle of the lens, while angles of the curved reflection mirror, the reflection mirror, and the screen are shown by the incident angles thereof.

Herein, the center position of the screen is put to be the origin of the system of coordinates (i.e., (x, y, z)=(0, 0, 0)). However, in this system, the horizontal direction of the screen is on the x-axis, and the positive (+) is on the right-hand side. Also, the vertical direction of the screen is on the y-axis, and the positive (+) is on the upper side. Further, the depth direction thereof is on the z-axis, and the negative (−) is the direction behind the image display apparatus. Further, the angles are those defined between the xz cross-section and the x-axis. And, the distances are the optical path lengths between the respective optical parts, from the central point of the image modulator element included in the image-generating source 1 to the center of the screen. Further, a unit of the x, y and z and the distance are [mm].

TABLE 1

| Optical Parts | x | y | z | Angle(°) | Distance |
|---|---|---|---|---|---|
| Projection Lens | 0 | −761.45 | −282.32 | 0 | 150 |
| 1st Curved Surface Reflection Mirror | 0 | −623.37 | −340.93 | 45 | 239.1 |
| 2nd Curved Surface Reflection Mirror | 0 | −529.95 | −120.84 | 45 | 312 |
| Plane Reflection Mirror | 0 | −240.75 | −240.75 | 56 | 343.3 |
| Screen 3 | 0 | 0 | 0 | 45 | 0 |

The following equation 1 is the multinomial for expressing a free curved surface, and the configurations of reflection surfaces can be obtained according to the equation 1, for the first curved surface reflection mirror 3 and the second curved surface reflection mirror 4. An example of the respective coefficients of the multinomial, for expressing the free curved surface configuration of the first curved surface reflection mirror 3, is shown in the following Table 2, and that of the respective coefficients of the multinomial, for expressing the free curved surface configuration of the second curved surface reflection mirror 4, in the following Table 3, respectively.

$$w = \Sigma c_j \cdot u^m \cdot v^n \quad \text{(Eq. 1)}$$

TABLE 2

$c_j$ of 1st Curved Surface Reflection Mirror

| | | | |
|---|---|---|---|
| $u^2$ | −3.2627956 × 10⁻⁴ | $V^7$ | −4.2384259 × 10⁻¹⁶ |
| $v^2$ | −2.7342603 × 10⁻⁶ | $U^8$ | −2.44870957 × 10⁻¹⁶ |
| $u^2v$ | 4.219671 × 10⁻⁶ | $U^6v^2$ | 5.59736313 × 10⁻¹⁶ |
| $V^3$ | −9.0741489 × 10⁻⁷ | $U^4v^4$ | −3.9135962 × 10⁻¹⁷ |
| $U^4$ | 3.76895394 × 10⁻⁸ | $u^2v^6$ | −4.82512597 × 10⁻¹⁷ |
| $u^2v^2$ | −6.49737092 × 10⁻⁸ | $V^8$ | −6.7465302 × 10⁻¹⁹ |
| $V^4$ | 2.20014707 × 10⁻³ | $U^8V$ | 1.882894699 × 10⁻¹⁷ |
| $U^4V$ | −2.9086400 × 10⁻¹⁰ | $U^6v^3$ | 9.969359116 × 10⁻¹³ |
| $u^2v^3$ | −3.4334099 × 10⁻¹¹ | $U^4v^5$ | −2.42837400 × 10⁻¹⁸ |
| $V^5$ | −3.2694900 × 10⁻¹² | $u^2v^7$ | −2.46749206 × 10⁻¹⁹ |
| $u^6$ | −2.18676160 × 10⁻¹² | $V^9$ | 1.86624308 × 10⁻²⁰ |
| $U^4v^2$ | 9.93709435 × 10⁻¹³ | $U^{10}$ | −9.74821072 × 10⁻²¹ |
| $u^2v^4$ | 1.830653575 × 10⁻¹² | $U^8v^2$ | −1.60666389 × 10⁻¹⁹ |
| $v^6$ | −7.83618202 × 10⁻¹⁴ | $U^6v^4$ | −1.82715283 × 10⁻²⁰ |
| $u^6v$ | −7.07996207 × 10⁻¹⁴ | $U^4v^6$ | 1.57793776 × 10⁻²⁰ |
| $U^4v^3$ | 3.1929889 × 10⁻¹⁴ | $U^2v^8$ | 2.10989801 × 10⁻²¹ |
| $u^2v^5$ | 5.88653028 × 10⁻¹⁷ | $V^{10}$ | −2.91564903 × 10⁻²³ |

TABLE 3

$c_j$ of 2nd Curved Surface Reflection Mirror

| | | | |
|---|---|---|---|
| $u^2$ | −7.0783312 × 10⁻⁴ | $V^7$ | −6.15789986 × 10⁻¹⁵ |
| $v^2$ | 1.40773686 × 10⁻⁴ | $U^8$ | 8.458346543 × 10⁻¹³ |
| $u^2v$ | −3.23558379 × 10⁻⁶ | $U^6v^2$ | −1.54520583 × 10⁻¹⁷ |
| $V^3$ | −3.658032027 × 10⁻⁷ | $U^4v^4$ | 1.02166797 × 10⁻¹⁷ |
| $U^4$ | 1.384747347 × 10⁻⁸ | $u^2v^6$ | −3.01595786 × 10⁻¹⁷ |
| $u^2v^2$ | −1.248068173 × 10⁻⁸ | $V^8$ | 3.855409065 × 10⁻¹⁷ |
| $V^4$ | −4.698830800 × 10⁻⁹ | $U^8V$ | −3.06405908 × 10⁻²⁰ |
| $U^4V$ | 5.448132025 × 10⁻¹¹ | $U^6v^3$ | 3.00052439 × 10⁻²⁰ |
| $u^2v^3$ | −5.46538633 × 10⁻¹¹ | $U^4v^5$ | −9.83809597 × 10⁻²⁰ |
| $V^5$ | 3.707619336 × 10⁻¹¹ | $u^2v^7$ | 3.316504812 × 10⁻¹⁹ |
| $u^6$ | −4.17675900 × 10⁻¹³ | $V^9$ | −8.37876233 × 10⁻²⁰ |
| $U^4v^2$ | 3.874442611 × 10⁻¹³ | $U^{10}$ | −1.05747627 × 10⁻²² |
| $u^2v^4$ | −1.91573949 × 10⁻¹⁴ | $U^8v^2$ | 7.491755095 × 10⁻²³ |
| $v^6$ | 4.21324044 × 10⁻¹⁴ | $U^6v^4$ | −2.16969819 × 10⁻²³ |
| $u^6v$ | −3.52688320 × 10⁻¹⁶ | $U^4v^6$ | 5.684876639 × 10⁻²² |
| $U^4v^3$ | 6.905122262 × 10⁻¹⁷ | $U^2v^8$ | −1.02473070 × 10⁻²¹ |
| $u^2v^5$ | 5.931535661 × 10⁻¹⁶ | $V^{10}$ | 7.886171405 × 10⁻²³ |

Herein, within the coordinates system of the equation 1 mentioned above, the horizontal direction is a "u" coordinate, the vertical direction a "v" coordinate, and further the direction same to the z-axis is a "w" coordinate, respectively. Also, within the equation 1 mentioned above, "$c_j$" is an coefficient of $u^m \cdot v^n$, which is obtained with using the equation 2 shown below, and "j" is an integer being equal or greater than 2.

$$j = [(m+n)^2 + m + 3n]/2 + 1 \quad \text{(Eq. 2)}$$

In this manner, the respective reflection surfaces of the first curved-surface reflection mirror 3 and the second curved-surface reflection mirror 4, according to the present embodiment, define the configuration of the free curved surface. This free curved surface configuration is in symmetry on both sides of a center of the y-axis, in the present embodiment, but in asymmetry on both sides of a center of the x-axis. Thus, the respective reflection surfaces of the first curved-surface reflection mirror 3 and the second curved-surface reflection mirror 4, according to the present embodiment, define the free curved surface configuration, being not in rotation symmetry. And, at least either one of them is curved, so as to direct a project into the reflection direction thereof, and also the curvature in is made larger in a portion, which reflects the light beam incident upon the lower end of the transmission-type screen 3, than that of a portion, which reflects the light beam incident upon the upper end of the screen. Or, they may be, the either one portion, which reflects the light beam indecent upon the lower end of the screen, defines the configuration projecting into the reflecting direction thereof, while the portion, which reflects the light beam incident upon the upper end of the screen, defines the configuration recessing into the reflecting direction thereof.

Also, the equation 3 mentioned below is the multinomial for expressing the aspheric surface, and in accordance with this equation, the configuration can be obtained of the original surface of the Fresnel lens sheet 8. An example will be shown in the Table 4 below, about the respective coefficients of the multinomial, expressing the configuration of the original surface formed on the Fresnel lens sheet 8, according to the present invention.

$$z = (c \cdot r^2)/[1 + \{1 - (1+k) \cdot c^2 \cdot r^2\}^{1/2}] + d_4 \cdot r^4 + d_6 \cdot r^6 + d_8 \cdot r^8 + d_{10} \cdot r^{10} + d_{12} \cdot r^{12} + d_{14} \cdot r^{14} + \cdots \quad \text{(Eq. 3)}$$

TABLE 4

| | |
|---|---|
| c | −2.89878 × 10⁻² |
| k | −1.0541549 |
| $d_2$ | −0.386266 × 10⁻⁴ |
| $d_4$ | 0.760589 × 10⁻⁹ |
| $D_6$ | −0.431335 × 10⁻¹⁴ |
| $d_8$ | 0.111331 × 10⁻¹⁹ |
| $d_{10}$ | −0.148576 × 10⁻²⁵ |
| $d_{12}$ | 0.100254 × 10⁻³¹ |
| $d_{14}$ | −0.2707 × 10⁻³⁸ |

Herein, "z" indicates an amount of sag on the surface in parallel with the z-axis, "r" the distance from the rotation axis, "c" the curvature at an apex, "k" conic constant, "$d_n$" (n=2, 4, 6, 8, 10, 12 . . . , a multiple of two (2)) the coefficient of an aspheric surface, respectively.

And, with the Fresnel lens sheet 8 according to the present invention, the central axis of the Fresnel lens (please see a reference numeral 12 in FIG. 2) is set at a position far from the center of screen at distance of 545 mm downwards, from distribution of the image lights upon the screen. Namely, according to the present embodiment, the Fresnel lens sheet 8 mentioned above does not have the said central axis on the surface of the sheet, but rather the central axis of the Fresnel lens is located at a position coming out of the surface on the Fresnel lens sheet 8. In other words, according to the present embodiment, the central position of the zone plates building up the prism surfaces lies in an outside of an area, on which the image display apparatus displays the image thereof. And, each of the prisms building up the Fresnel lens is formed along a concentric arc, surrounding the central axis locating within the outside of that screen.

Figure 4:
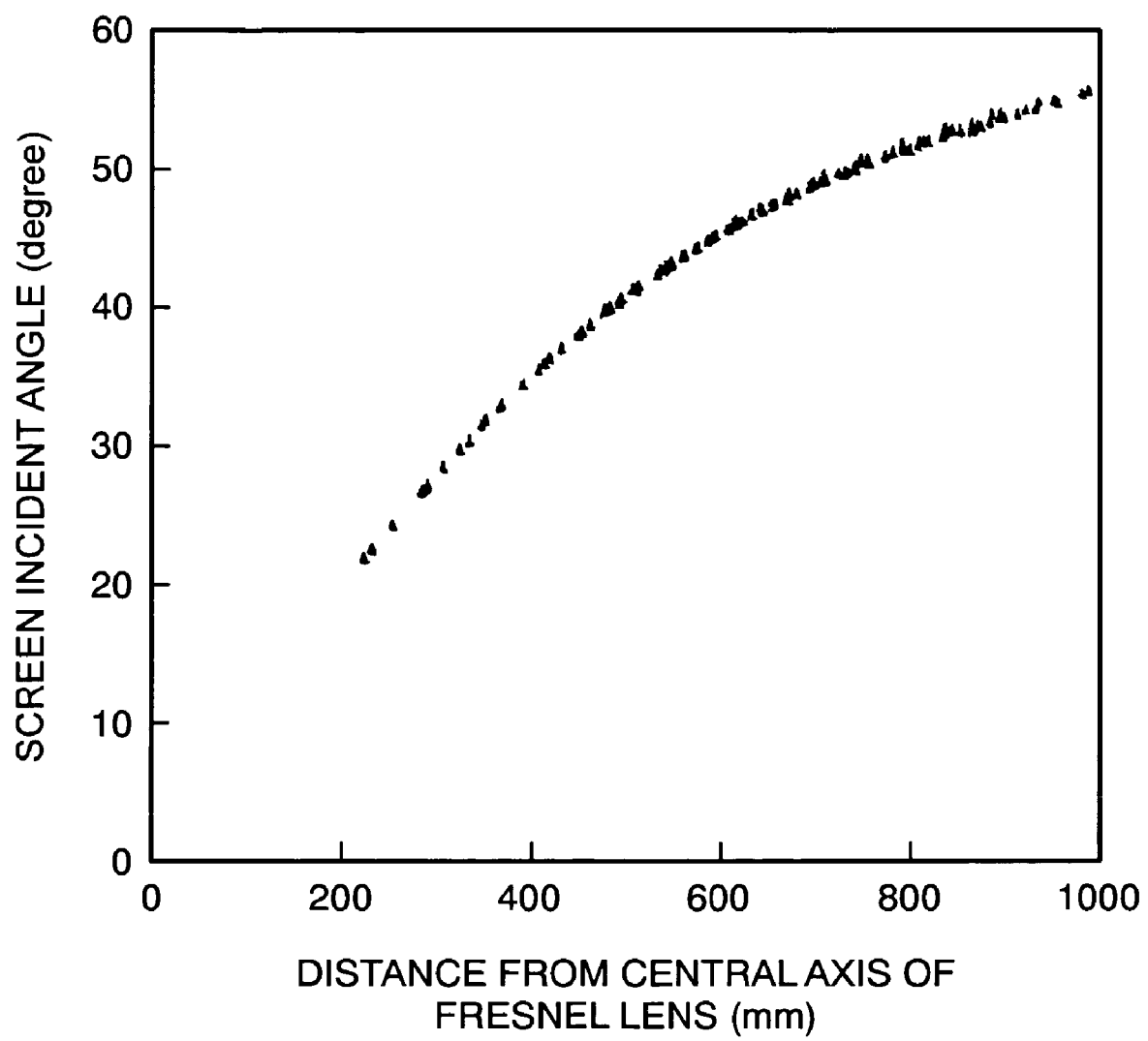
FIG. 4 is a view for showing the distribution of indecent angles of the incident light beams upon the rear-projection type screen, according to the present embodiment.
Figure 6:
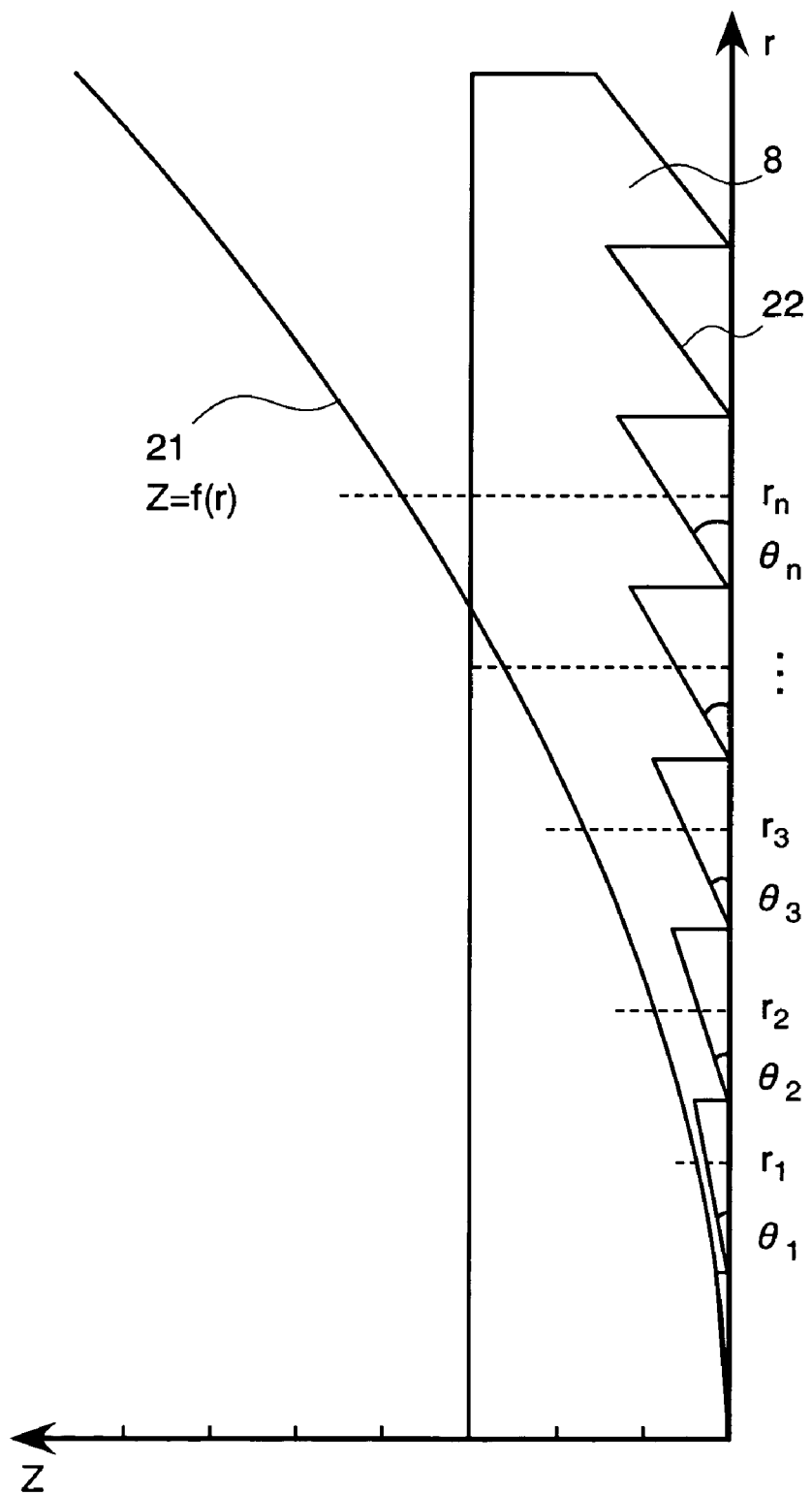
FIG. 6 is a view for showing a relationship between a prism surface and an original surface of the Fresnel lens sheet, according to the present invention.

Herein, a relationship is shown in FIG. 6, between the original surface 21 of the Fresnel lens sheet, which is obtained from the coefficients of the aspheric surface shown in FIG. 4 mentioned above, and the each prism surface 22 of the Fresnel lens. FIG. 6 shows a cross-section, being in parallel with the perpendicular line to said Fresnel lens sheet 8 and including the rotation axis mentioned above. In this FIG. 6, "r", corresponding to the "r" shown in Table 3, depicts the distance from the rotation axis. The Fresnel angle "$\theta_1$" of the prism surface 22 of the Fresnel lens at a location "$r_1$" (i.e., an angle defined between the principle plane of the Fresnel lens sheet 8 and the prism surface) is nearly equal to an inclination on the original surface (i.e., a tangential line) at the said distance "$r_1$". Namely, assuming that the equation of the aspheric surface is $Z(=f(r_n))$ and "n" is an integer equal to or greater than one (1), the Fresnel angle "$\theta_n$" at each position o the Fresnel lens sheet 8 can be expressed by the following equation 4:

$$\theta_n = f(r_n)' \tag{Eq. 4}$$

Then, the Fresnel angle obtained is $\theta_1 = f(r_1)'$, $\theta_2 = f(r_2)'$, $\theta_3 = f(r_3)'$ . . . In this manner, the Fresnel angle "$\theta_n$" at each position o the Fresnel lens sheet 8 corresponds to a difference value at the each position (i.e., at the each distance "$r_n$") of the aspheric surface equation. The Fresnel angle "$\theta_n$" is determined at each of the positions on the Fresnel les sheet 8, in this manner. As was mentioned above, the light beams incident upon the Fresnel lens sheet 8 are refracted through the respective prism surfaces of the Fresnel lens. Forming the original surface 21 of the Fresnel lens sheet 8 into such the aspheric surface configuration, depending on the incident angle of incident light beam at each of the positions on the Fresnel lens sheet, brings the each light beams, being refracted by the resepective prism surface, to be nearly in parallel with the perpendicular line to the Fresnel lens sheet 8. In the present embodiment, the Fresnel angle "$\theta$" of the prism surface 22, which locates at an upper portion of the Fresnel sheet (i.e., the farthest location from the rotation angle), is made to be larger than that of the Fresnel angle "$\theta$" of the prism surface 22, which locates at a lower portion of the Fresnel sheet (i.e., the nearest location from the rotation angle). This is because the incident angle of the light beam in the upper portion of the screen is larger than that in the lower portion thereof, in the oblique projection optical system according to the present embodiment. Also, according to the present embodiment, since the rotation axis locates outside the Fresnel lens sheet 8, the each surface 22 is inclined in the same direction.

FIG. 4 attached shows a distributing condition, in the form of a graph, of the incident angles of the light beams (i.e., projection lights) onto the screen (on the vertical axis), with respect to the distances from the central axis of the Fresnel lens (on the horizontal axis), which are actually observed in the enlarged projection optical system constructed in the manner mentioned above.

Figure 5:
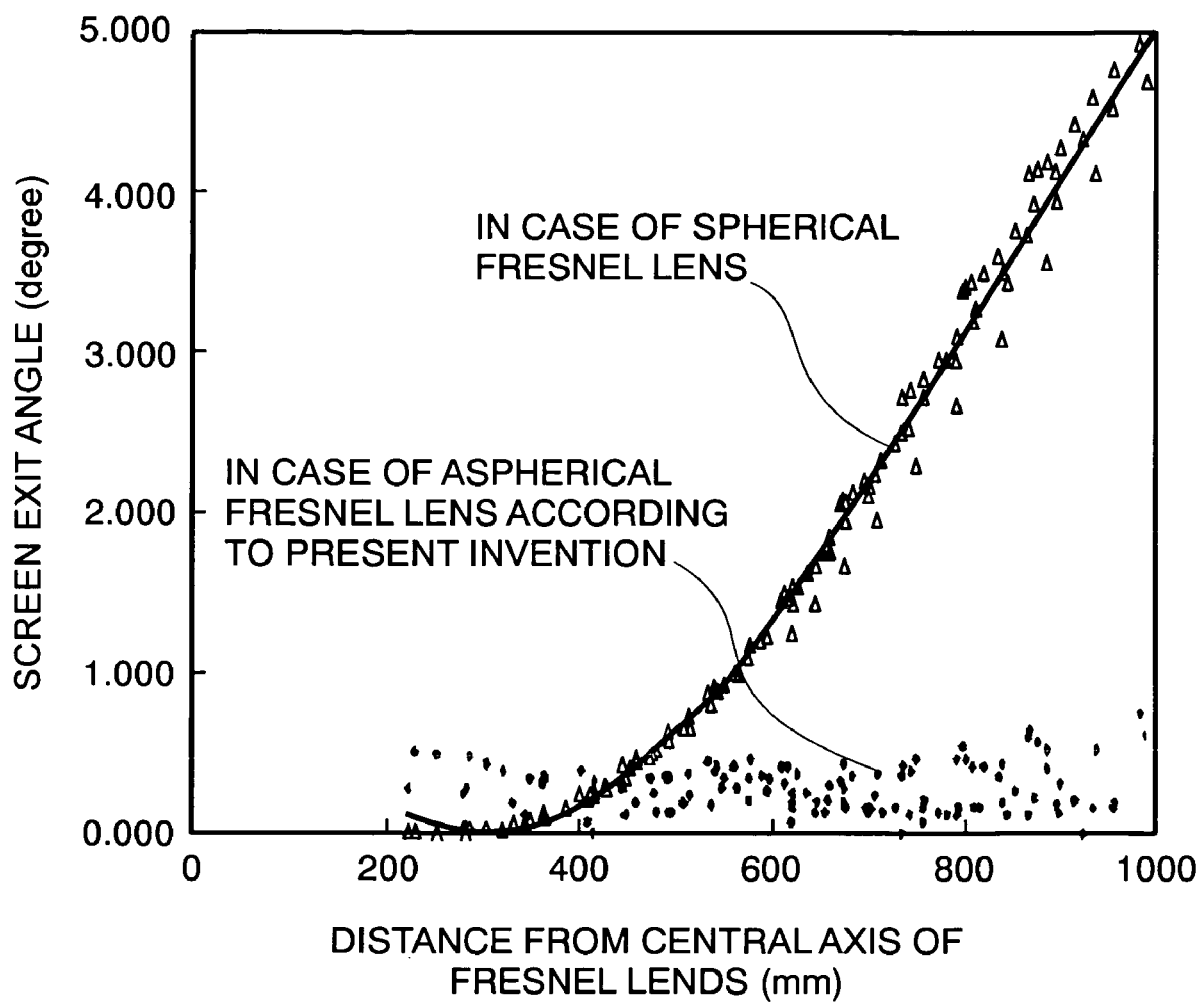
FIG. 5 is a view for showing the distribution of exit angles of the exit light beams upon the rear-projection type screen, according to the present embodiment.

Also, FIG. 5 attached shows a distributing condition, in the form of a graph, of the exit angles of the light beams (i.e., projection lights) exiting from the screen (i.e., an angle defined between the light beam and the perpendicular line to the screen), with respect to the distances from the central axis of the Fresnel lens (on the horizontal axis). However, in this figure, a curved line shows the exit angles of the light beam in case of using the Fresnel lens sheet 8 having a Fresnel lens, the original surface of which is formed to be sphere-like, for comparison thereof.

Thus, as is apparent from the graph shown in the figure mentioned above, with the Fresnel lens having the original surface of a spherical configuration, there is produced the difference of about 5 degrees at the maximum, depending upon the distance from the central axis of the Fresnel lens (on the horizontal axis). For this reason, with such the Fresnel lens having the original surface of the spherical configuration, the brightness comes to be unequal or uneven on the screen. On the contrary to this, with the Fresnel lens sheet 8 according to the present embodiment, since the original surface thereof is in the aspheric surface configuration, the exit angle of the light can be suppressed to be equal to or within about 0.8 degree, irrespective of the distance (on the horizontal axis) from the central axis of the Fresnel lens. In other words, because the exit angle of the light beam exiting form the screen can be made in parallel with the perpendicular line to the screen, approximately, therefore it is possible to keep the brightness of the display picture to be equal or uniform, all over the screen, as a whole.

Also, with the image display apparatus having a screen diagonal of 50 inches (a ratio between vertical and horizontal=9:16, for example), adopting the enlarged projection optical system having such the structure as was mentioned above therein, the thickness or depth of the apparatus is about 300 mm. Thus, according to the present embodiment, it can be seen that the apparatus can be thinned in the thickness, further. However, the projection lens in the embodiment mentioned above has a projection distance of 1,300 mm, and has a function of being able to project the picture, enlargedly, onto the screen having the diagonal of 50 inches (the ratio between vertical and horizontal=9:16). However, in particular, with such the sizes of the constituent elements and/or the numeric values indicative of characteristics thereof mentioned above, the present invention should not be limited only to such disclosed in the embodiment mentioned above. For example, it is apparent for a person skilled in the art, that the above sizes and the characteristics or properties can be obtained, appropriately, through an optical design, together with the curved surface reflection mirror mentioned above, for adjusting or fitting with the specification of the oblique projection angle and/or the projection distances, etc.

Also, in the embodiment mentioned above, the disposition is made so that the optical axis of the projection lens lies within the yz-plane, and further that the optical axis of the image light is reflected upon, by means of two (2) pieces of the curved surface reflection mirror and one (1) piece of the plane reflection mirror, within the said plane. However, the numbers and positions of those should not be limited only to those of the embodiment mentioned above.

For example, it is also possible to make disposition so that, the direction of optical axis of the projection lens is in the direction of x-axis, while the optical axis is bent into the z-axis direction by the reflection mirror or the curved surface reflection mirror, thereby reflecting the light by the curved surface reflection mirror and the plane surface reflection mirror on the yz-plane. However, with such the disposition, it is possible to receive the projection lens and the image source within a lower side in the housing, in a compact manner. Therefore, there can be achieved an effect of suppressing the height of the image display apparatus.

Also, for the projection optical system to be applied in the present embodiment, it is sufficient to have at least one of the curved surfaces, for compensating the aberration, as well as, the trapezoidal distortion, and it should not be limited to that of using two (2) pieces of the curved surface reflection mirrors, as in the present embodiment. For example, the curved surface may be one (1) or more pieces reflection-type free curved surfaces. Or, it may be, not being the reflection-type, but one (1) or more pieces refraction-type free curved surfaces. Furthermore, it is needless to say that both the reflection-type free curved surface (i.e., a free curved surface reflection mirror) and the refraction-type free curved surface (i.e., a free curved surface lens) may be combined with. Herein, the free curved surface lens is so curved that the concaved surface is directed to the exit direction of the light, and further may have the configuration so that the curvature of a portion, through which passes the light incident upon a lower end of the screen, is larger than that of a portion, through which passes the light incident upon an upper lower end thereof.

However, the explanation was given within the embodiment mentioned in the above, the prism surface thereof is obtained for calculating out the aspheric surface of the lens, which makes up the Fresnel lens sheet 8 mentioned above. However, in that instance, there are sometimes cases where it is difficult to make optimization thereof, depending on the oblique projection distance and/or the projection distance or angle. Hereinafter, explanation will be made about a method for obtaining a preferable prism surfaces, in such the cases.

In general, the image display apparatus has a view angel in the horizontal direction, being wider than that in the vertical direction. For this reason, the diffusion property is improved in the horizontal direction, through the function of the lenticular lens. On the contrary to this, in the vertical direction, the view angle is widened with an aid of the diffusion material of the lenticular lens (see reference numerals 9 and 11 in FIG. 2). Then, the following will be done when obtaining the configuration of the prism surfaces of the Fresnel lens. Thus, not achieving the optimization by brining the light beam exiting from the screen to be in parallel with the perpendicular line to the screen, as was mentioned above; however, in the place thereof, the exit light beam is divided into a horizontal component and a vertical one, and then an angle is calculated out through the Snell's law, so as to bring the exit angle of vertical component comes to be zero (0) degree, approximately. With this, the prism surfaces can be obtained at the various positions on the screen.

Thus, with the original surface, which can be obtained through combining or continuing such the prism surfaces obtained in this manner, it is also possible to let the vertical component having low diffusion property to exit at the exit angle of zero (0) degree, approximately. For this reason, it is also possible to obtain a sufficient diffusion through the conventional diffusion material. On the other hand, with the horizontal component, since it has a good diffusion property, it can be diffused, sufficiently, by means of the lenticular lens, even if it is large in the exit angle thereof. As a result thereof, the uniformity can be obtained on the brightness of the projection image obtained upon the screen. However, in this instance, it is enough for the prism surfaces, which make up the Fresnel lens sheet 8 mentioned above, to be in the configuration of curved surface, but not restricted to be in the aspheric configuration, necessarily. However, as was mentioned above, with an aid of the Fresnel lens sheet 8 having the original surface formed in the aspheric configuration, it is possible to obtain a projection image, being in uniformity of the brightness, further, all over the screen. However, each of the prism surfaces may be one for defining a plane, respectively, on the cross-section of the Fresnel lens sheet 8 passing through the rotation axis thereof.

Within the embodiment mentioned above, the prism surfaces of the Fresnel lens, the original surface of which is in the aspheric configuration, are formed concentrically around the rotation axis mentioned above, and the said rotation axis lies in the outside of the image display region or area of the image display apparatus. However, this rotation angle may be within an inside of the image display region of the image display apparatus, and it should not be restricted only to the embodiment mentioned above. However, if possible to locate the central portion of the concentric circles or zones of forming the said prism surfaces within the outside of the image display region of the image display apparatus, it is possible to make an adjustment on a degree of refraction, which is necessary for letting the light to exit at the exit angle of about zero (0) degree upon the exit surface of the screen. The reason of this will be explained hereinafter. However, hereinafter, the adjustment on the degree of refraction is called by "refraction adjustment".

First, consideration is paid upon the case where the rotation axis mentioned above lies within the inside of the Fresnel lens sheet. The prism surface on a horizontal line, including the rotation axis therein, refracts the light only into the horizontal directions, i.e., into the both sides, the right-hand side and the left-hand side, but cannot refract it into the vertical directions, i.e., up-down directions. Accordingly, when the light including the components of up-down directions is incident upon the horizontal line, which includes that rotation axis therein, it is impossible to bring the incident light including the said components of up-down directions into a horizontal light (i.e., a light being in parallel with the perpendicular line to the principle plane of the screen), upon the prism surface on that horizontal line.

According to the present embodiment, as was mentioned above, there is applied the projection optical system for objecting the image, obliquely, from a lower portion of the screen, and further it has a curved surface for compensating the trapezoidal distortion and/or the aberration on the screen. In case of applying such the optical system, there are many cases where all of the incident light beams have the components of the up-down or vertical directions. Accordingly, for the Fresnel lens sheet 8, it is preferable to have the prism surfaces, every one of them refracting the lights into the vertical direction, thereby enabling to make the refraction adjustment on both directions, i.e., the horizontal direction and the vertical direction, at each of the positions on the Fresnel lens sheet 8.

For this reason, within the present embodiment, the rotation axis of the Fresnel lens is located in an outside of the Fresnel lens sheet 8, in the structure thereof. With this, all of the prism surfaces of the Fresnel lens sheet 8 are able to have a function to refract the light into the vertical direction. Accordingly, the refraction adjustment can be made easily, on both the horizontal and the vertical directions, at each of the positions on the Fresnel lens sheet 8. Namely, locating the rotation axis in the outside of the Fresnel lens sheet 8 enables to bring the incident lights onto the screen into the parallel lights, preferably.

As was fully explained in the above, the present embodiment applies the oblique projection optical system therein, for the purpose of shortening the depth, and further it is adopted into the image display apparatus of the structure having the curved surface reflection mirror for compensating the trapezoidal image distortion produced due to the oblique projection. And, in such the image display apparatus as was mentioned, for letting the incident lights having various incident angles thereof to exit from the screen, perpendicular thereto, approximately, according to the present embodiment, the original surface of the Fresnel lens formed on the Fresnel lens sheet is in the aspheric configuration. As a result of this, it is possible to make the exit angle of the lights exiting from the screen in parallel with the perpendicular line to the screen, approximately, almost all over the entire surface of the screen mentioned above, thereby enabling to obtain an image of being uniform in the brightness thereof, as well as, achieve the thin-sizing of the image display apparatus, at the same time.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An image display apparatus, comprising:
   an image generating source;
   a picture enlarging portion for enlarging a picture from said image generating source;
   a screen on which the enlarged picture is projected from a rear side thereof; and
   a projection optical portion for projecting the enlarged picture of said image generating source from said picture enlarging portion on said screen, through oblique projection thereof,
   wherein said screen includes at least a Fresnel lens sheet forming a Fresnel lens thereon, a plurality of prism surfaces of said Fresnel lens each having a Fresnel angle depending upon an incident angle of a light beam from the oblique projection on said each of prism surface, wherein said Fresnel angle is larger in an upper portion of said Fresnel lens sheet than in a lower portion thereof, upon a cross-section surface passing through a central axis of said Fresnel lens, and
   wherein said Fresnel lens is formed concentrically around a same point of a center, and said central point is located in an outside of said screen.

2. The image display apparatus, as described in the claim 1, wherein an inclination with respect to a perpendicular line on said Fresnel lens sheet is in a same direction, upon each of the prism surfaces of said Fresnel lens.

3. An image display apparatus, comprising:
   an image generating source;
   a picture enlarging portion for enlarging a picture from said image generating source;
   a screen on which the enlarged picture is projected from a rear side thereof; and
   a projection optical portion for projecting the enlarged picture of said image generating source from said picture enlarging portion on said screen, through oblique projection thereof,
   wherein said screen includes at least a Fresnel lens sheet forming a Fresnel lens thereon, and an original surface of the Fresnel lens, which is formed with gathering of respective prism surfaces thereof; defines an aspheric surface configuration,
   each prism surface having a Fresnel angle depending upon an incident angle of a light beam from the oblique projection, and
   wherein said Fresnel lens is formed concentrically around a same point of a center, and said central point is located in an outside of said screen.

4. The image display apparatus, as described in the claim 3, wherein a projection picture incident upon an incident surface of said Fresnel lens sheet, through the Fresnel lens including said prism surfaces, is exited at an exit angle of about zero (0) degree from an exit surface of said Fresnel lens sheet, almost all over an entire surface of said screen.

5. The image display apparatus, as described in the claim 3, wherein said projection optical portion includes a curved surface for compensating distortion and/or aberration produced due to oblique projection upon said screen.

6. The image display apparatus, as described in the claim 3, wherein said projection optical portion includes at least one of a refraction-type free curved surface and a reflection-type free curved surface.

7. A screen for use in a projection-type image display apparatus, comprising:
   a Fresnel lens sheet, on which a Fresnel lens comprising a plurality of prism surfaces is formed, wherein a projection image is incident upon an incident surface of said Fresnel lens from a direction inclined with respect to a perpendicular line on said Fresnel lens, and
   a Fresnel angle of said each of prism surface of said Fresnel lens depending upon an incident angle of a light beam through the oblique projection, wherein said Fresnel angle is larger in an upper portion of said Fresnel lens sheet than that in a lower portion thereof, upon a cross-section surface passing through a central axis of said Fresnel lens, and
   wherein said Fresnel lens is formed concentrically around a same point of a center, and said central point is located in an outside of said screen.

8. The screen, as described in the claim 7, wherein an inclination with respect to a perpendicular line on said Fresnel lens sheet is in a same direction, upon each of the prism surfaces of said Fresnel lens.

9. A screen for use in a projection-type image display apparatus, comprising:
   a Fresnel lens sheet, on which a Fresnel lens is formed, wherein a projection image is incident upon an incident surface of said Fresnel lens from a direction inclined with respect to a perpendicular line on said Fresnel lens, and
   an original surface of the Fresnel lens, which is formed with gathering of respective prism surfaces thereof, defines an aspheric surface configuration,
   each prism surface having a Fresnel angle depending upon an incident angle of a light beam from the oblique projection incident on said each prism surface, and
   wherein said Fresnel lens is formed concentrically around a same point of a center, and said central point is located in an outside of said screen.

10. The screen, as described in the claim 9, wherein a projection picture incident upon an incident surface of said Fresnel lens sheet, through the Fresnel lens including said prism surfaces, is exited at an exit angle of about zero (0) degree from an exit surface of said Fresnel lens sheet, almost all over an entire surface of said screen.

11. The screen, as described in the claim 9, wherein a lenticular lens is formed on an exit fide of light of said Fresnel lens sheet.

12. The screen, as described in the claim 11, wherein said lenticular lens includes a diffusion material within an inside thereof, and is proved with a light absorption member on an exit side thereof.

* * * * *